(12) United States Patent
Fleming-Dahl

(10) Patent No.: US 6,442,495 B1
(45) Date of Patent: Aug. 27, 2002

(54) AVERAGE SIGNAL TO NOISE RATIO ESTIMATOR

(75) Inventor: Arthur Fleming-Dahl, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 09/383,181

(22) Filed: Aug. 25, 1999

(51) Int. Cl.[7] ............................................. G01R 29/26

(52) U.S. Cl. .................... 702/69; 702/190; 375/227; 324/614

(58) Field of Search .................. 702/69, 190, 191, 702/111, 181, 194, 195; 708/300, 426, 445; 375/227, 341, 367; 381/317, 94.1; 324/614

(56) References Cited

U.S. PATENT DOCUMENTS

| | | | | |
|---|---|---|---|---|
| 3,737,781 A | * | 6/1973 | Deerkoski | 702/69 |
| 4,688,234 A | * | 8/1987 | Robinton | 375/227 |
| 5,166,954 A | * | 11/1992 | Grizmala et al. | 375/227 |
| 5,379,346 A | | 1/1995 | Pecora et al. | |
| 5,432,697 A | | 7/1995 | Hayes | |
| 5,473,694 A | | 12/1995 | Carroll et al. | |
| 5,510,976 A | | 4/1996 | Tanaka et al. | |
| 5,680,462 A | | 10/1997 | Miller et al. | |
| 5,748,851 A | | 5/1998 | Iokibe et al. | |
| 5,764,551 A | * | 6/1998 | McCorkle | 702/69 |

OTHER PUBLICATIONS

Herve Dedieu, Michael Peter Kennedy and Martin Hasler, "Choas Shift Keying: Modulation and Demodulation of a Chaotic Carrier Using Self–Synchronizing Chua's Circuits", Oct. 1993, pp. 634–641.

Scott Hayes and Celso Grebogi, "Coding information in the natural complexity of chaos", 1993, pp. 153–160.

Scott Hayes, Celso Grebogi, Edward Ott and Andrea Mark, "Controlling Symbolic Dynamics for Communication", 1993, pp. 122–129.

Louis Pecora, "Overview of chaos and communications research", 1993, pp. 2–21.

Philip Downes, "Secure Communication Using Chaotic Synchronization", 1993, pp. 227–234.

Henry D.I. Abarbanel and Paul S. Linsay, "Secure Communications and Unstable Periodic Orbits of Strange Attractors", Oct. 1993, pp. 643–645.

Thomas L. Carroll and Louis M. Pecora, "Synchronizing Chaotic Systems", 1993, pp. 32–42.

Thomas L. Carroll and Louis M. Pecora, "Synchronizing Nonautonomous Chaotic Circuits", 1993, pp. 646–649.

Jorg Schweizer, "A stochastic approach to spread spectrum communication using chaos", 1995, pp. 115–124.

T. L. Carroll, "Amplitude–independent chaotic synchronization and communication", 1995, pp. 181–187.

Ute Feldmann, Martin Hasler and Wolfgang Schwarz, "Communication by Chaotic Signals: the Inverse System Approach", 1995, pp. 680–683.

(List continued on next page.)

*Primary Examiner*—Marc S. Hoff
*Assistant Examiner*—Hien Vo
(74) *Attorney, Agent, or Firm*—Taylor Russell & Russell, PC

(57) ABSTRACT

The present invention is a system and method of use for a computer-implemented signal-to-noise-ratio (SNR) estimation process for aiding in signal demodulation and message recovery or as an indication of recovered message fidelity. The SNR estimator produces estimates of the true channel SNR and tracks changes in the channel noise power over time. It operates on a collection of received data probability density functions (PDFs), either contained in closed form equations or stored in lookup tables. It allows for the estimation of both the instantaneous and average signal-to-noise ratio (SNR) values.

32 Claims, 11 Drawing Sheets

OTHER PUBLICATIONS

Martin Hasler, "Engineering chaos for encryption and broadband communication", 1995, pp. 115–125.

Maciej J. Ogorzalek, "view of electronic chaos generation, control, and applications", 1995, pp. 2–10.

Kevin M. Short, "Unmasking A Modulated Chaotic Communications Scheme", 1995, pp. 367–375.

T. L. Carroll, "Using Filters For Chaotic Synchronization For Communications", 1995, pp. 688–690.

Scott Hayes and Celso Grebogi, "Digital Communication Using Controlled Chaos: Theory And Experiment", 1996, pp. 170–173.

Jorg Schweizer and Martin Hasler, "Multiple Access Communications Using Chaotic Signals", 1996, pp. 108–111.

Frank Dachselt, Kristina Kelber and Wolfgang Schwarz, "Chaotic Coding and Cryptoanalysis", 1997, pp. 1061–1064.

Hiroyuki Kamata, Tetsuro Endo and Yoshihisa Ishida, "Communication With Chaos Via DSP Implementations", 1997, pp. 1069–1072.

Zbigniew Kotulski and Janusz Szczepanski, "Discrete chaotic cryptography", 1997, pp. 381–394.

Chang–song Zhou and Tian–lun Chen, "Robust communication via chaotic synchronization based on contraction maps", 1997, pp. 60–65.

Hong Zhou, Xie–Ting Ling and Jun Yu, "Secure Communication Via One–dimensional Chaotic Inverse Systems", 1997, pp. 1029–1032.

* cited by examiner

PROBABILITY Fn (x,SNR)

AVERAGE SIGNAL TO NOISE RATIO ESTIMATOR

The present invention relates generally to determining the signal-to-noise-ratio in a received signal transmission and more particularly to a system and method of use for a computer-implemented signal-to-noise-ratio estimation process for aiding in signal demodulation and message recovery or as an indication of recovered message fidelity.

BACKGROUND

All communication systems are susceptible to interfering signals normally referred to as noise. The interfering signals may have harmful effects on the performance of any communication system. These effects depend on the specific system being used, on the nature of the noise and the way it interacts with the signal without noise, and on the relative intensity of the noise compared to that signal. The intensity of the noise compared to that of the signal is usually measured by the signal-to-noise-ratio (SNR), which is the ratio of the power of the signal to the power of the noise. Signal receivers, in attempting to demodulate a signal and recover its contents, need to be able to accurately estimate the SNR.

DESCRIPTION OF THE INVENTION

The present invention is a computer-implemented signal-to-noise ratio (SNR) estimator that produces estimates of the true channel SNR and tracks changes in the channel noise power over time. It can be used by many receivers as an aid to demodulation and message recovery or as an indication of recovered message fidelity. It operates on a collection of received data probability density functions (PDFs), either contained in closed form equations or stored in lookup tables. It allows for the estimation of both the instantaneous and average signal-to-noise ratio (SNR) values. The invention can be generally used as a noise power estimator or SNR estimator for dynamic threshold level determination in a receiver with nonstationary (time-varying) noise, or a receiver whose received signal comprises data with unequal a priori transmit probabilities, such as encoded binary antipodal messages whose codes are structured to contain more zeros than ones or vice versa. SNR determination is required in some communications systems to estimate recovered messaged fidelity, for example to provide circular error probability figures on location calculations in global positioning satellite (GPPS) receivers and for hand off algorithms in cellular mobile communications receivers. The average SNR estimator can be used with many types of communication systems including spread spectrum systems, encrypted secure communications systems, chaotic communication systems, and LPD systems utilizing receiver-feedback transmit power level control.

The present invention comprises method in a computer system for determining a signal-to-noise ratio (SNR) in a signal comprising, for each iterate value of the signal: calculating an instantaneous maximum likelihood SNR; calculating a current average SNR value as a running weighted average of the instantaneous maximum likelihood SNR; and using the current average SNR value as feedback to the instantaneous maximum likelihood SNR to determine if a local instantaneous maximum likelihood value close to the current average SNR value exists, and if a local instantaneous maximum likelihood value close to the current average SNR exists, saving the local instantaneous maximum likelihood value as the SNR for the value of the signal. If a local instantaneous maximum likelihood value close to the current average SNR does not exist, a global maximum value is saved as the SNR for the value of the signal. If a local maximum instantaneous likelihood value does not exist, the global maximum value is the maximum likelihood SNR value closest to the current average SNR estimate. The instantaneous maximum likelihood SNR may be determined using a lookup-table and may comprise the SNR having the largest probability density function value for the iterate value of the signal. The instantaneous maximum likelihood SNR may also be derived using closed form equations. The closed form equations comprise: modeling a transmit probability density function (PDF) as a DC level plus a summation of weighted Gaussian functions; modeling the channel noise PDF as a Gaussian function; convolving the transmit PDF function model with the noise PDF model to determine the received PDF model as a function of the instantaneous SNR; using the received PDF model for the received value; and determining an instantaneous maximum probability SNR for the received value using an iterative root approximation optimization technique. The iterative root approximation technique may use Newton-Raphson equations or modified Newton-Raphson equations. The method using modified Newton-Raphson equations comprises: finding a maxima of the probability function of SNR; limiting a maximum correction per step to detect the maxima of the probability function of SNR; and multiplying a computed step size by at least two factors to prevent missing a peak, wherein the peak indicates the maximum likelihood SNR that caused the received iterate. The at least two factors may be alternating factors. The iterative root approximation technique using modified Newton-Raphson equations renders minima into repulsive fixed points and maxima into attractive fixed points.

The running weighted average may use a reciprocal of a probability of a data pair as weighting values in the running weighted average and the data pair may comprise a received value of the iterate and the SNR most likely to have caused the received value. A first derivative and a second derivative of the received value PDF are calculated for use in the iterative root approximation optimization technique using closed form equations or using numerical differentiation. The instantaneous maximum likelihood SNR for each iterate may be determined using a Newton-Raphson iterative root approximation optimization technique or a modified Newton-Raphson root approximation. The instantaneous maximum likelihood SNR estimate may comprise: constructing a two dimensional probability model of a received probability density function; slicing the two dimensional model along an SNR axis; determining the maximum likelihood SNR for the current received value by using the two dimensional probability model in a Newton-Raphson iteration; and using a current average SNR value as feedback to the instantaneous maximum likelihood SNR estimator to determine if a local maximum instantaneous likelihood value close to the current average SNR value exists. The local maximum SNR is the SNR for the value of the signal, if a local maximum instantaneous likelihood value close to the current average SNR value exists. The global maximum value as the SNR may be saved for the value of the signal if a local maximum instantaneous likelihood value close to the current average SNR value does not exist, where the global maximum value is the maximum likelihood SNR value closest to the current average SNR estimate.

A method for displaying probability density function (PDF) dependency on signal-to-noise ratio (SNR) in a signal comprises, for each iterate value of the signal: displaying a two dimensional probability model of a received probability density function; displaying a maximum likelihood SNR for a current received value on the two dimensional model sliced along an SNR axis; displaying a local instantaneous maximum likelihood value as the SNR if a local maximum likelihood value close to the current average SNR exists; and displaying a global maximum value as the SNR if a local instantaneous maximum value close to the current average SNR does not exist.

The computer instructions in the form of computer executable software code for implementing the above methods may be stored on computer-readable media.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
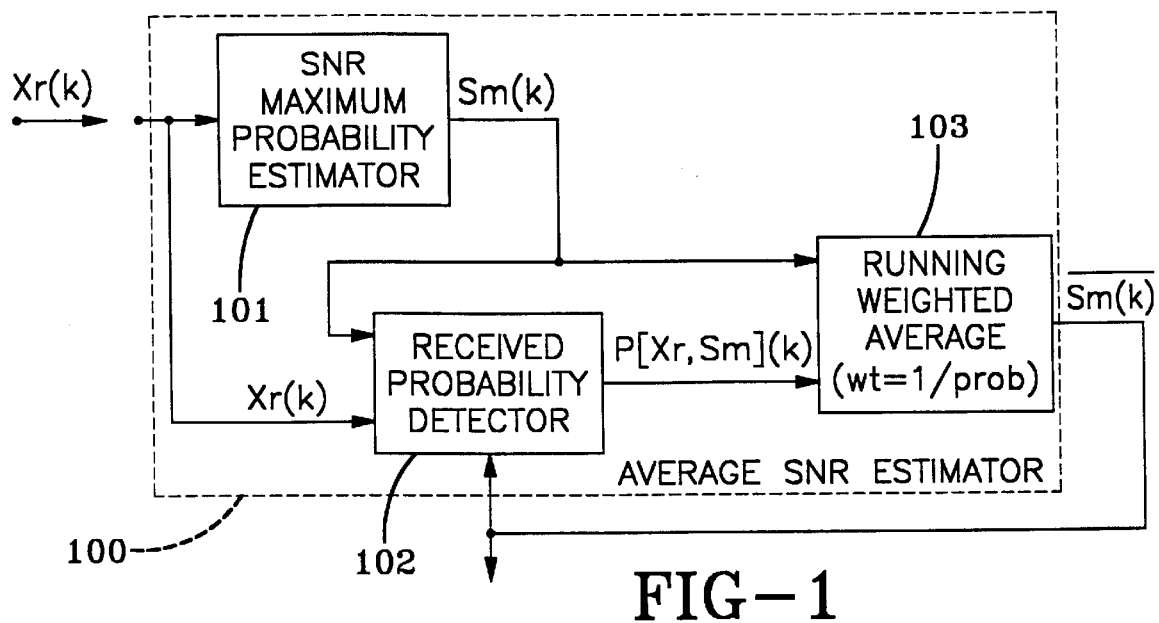
FIG. 1 is a block diagram of the average SNR estimator.

FIG. 1 is a block diagram of the average SNR estimator 100 for estimating the noise power or SNR contained in a signal contaminated with random noise. The SNR estimator comprises an SNR maximum probability estimator 101, a received probability detector 102, and a running average calculation function 103. The received probability detector 102 detects received probability density function (PDF) changes. The received PDF changes continuously as the noise content added by the channel changes. No noise results in the received PDF equaling the transmit PDF, while a noise power larger than the signal power will cause the received PDF to closely resemble the noise PDF.

Figure 2:
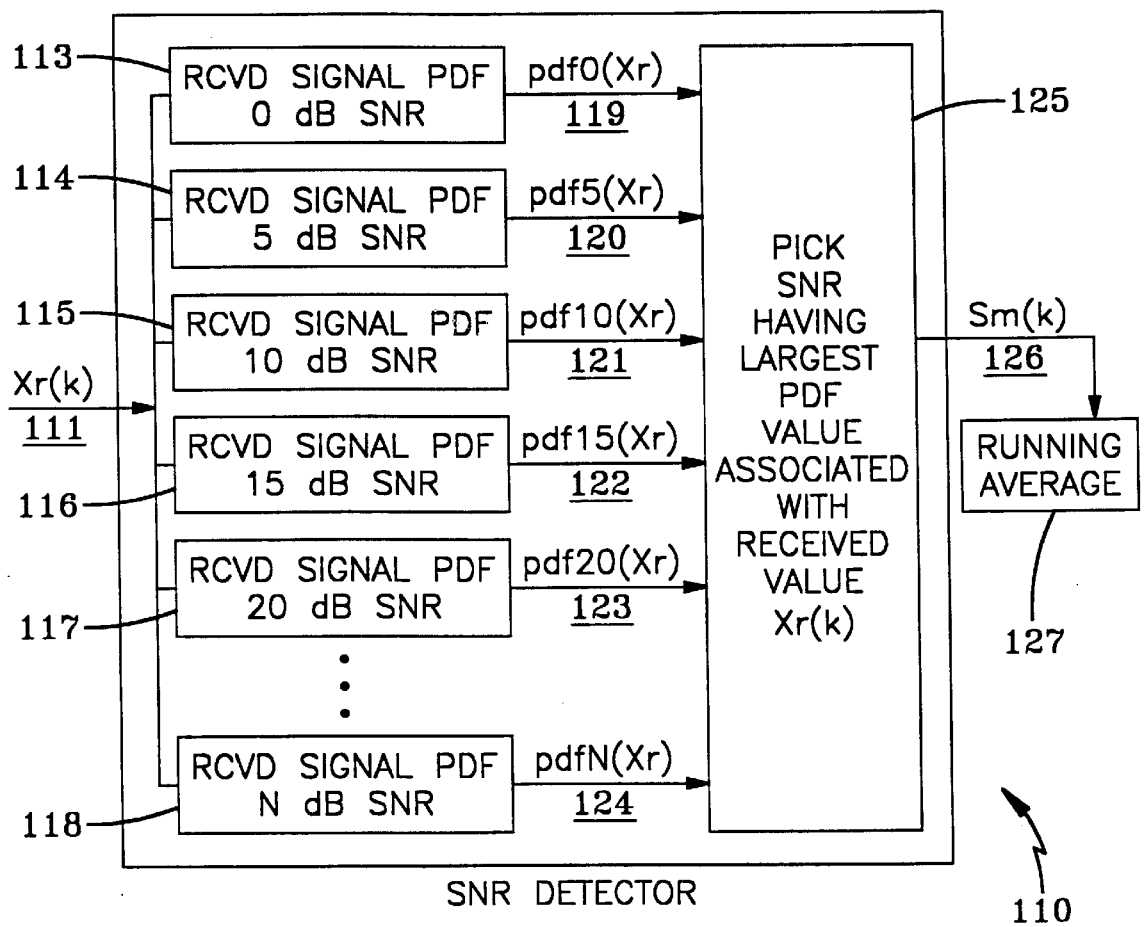
FIG. 2 is a block diagram of an SNR estimator based on a lookup table approach.

Turning now to FIG. 2, a block diagram of an SNR estimator 110 based on a lookup table approach is shown. This implementation of instantaneous SNR determination uses a lookup table to find the maximum likelihood SNR for a received iterate. The instantaneous SNR for a given received value can be defined as the one for which a received PDF trace has the greatest probability of occurrence at the received value out of the PDF traces for all SNR values. A received signal iterate Xr(k) 111 is fed into an SNR detector 112. The received signal PDFs for various SNR values 113 through 118 are stored in memory in a lookup table, with the example shown in FIG. 2 having a 5 dB SNR granularity. The received value 111 is passed into the lookup table and the corresponding PDF value (pdfNdb(Xr)) is returned 119 through 124. The SNR having the greatest PDF value at the current received iterate value is chosen 125. The SNR decisions for each received iterate Sm(k) 126 are smoothed through a running average calculation 127. The lookup table approach can be used for any empirically generated received PDF traces and/or transmit PDFs. Empirical received PDF traces are the most general because they are exact regardless of the transmit PDF and noise PDF for a given point in time, but are difficult to obtain because of the large number of iterates required. For this reason, they do not lend themselves well to changing channel conditions, where a different SNR granularity may be desired. Empirical transmit PDF traces perform well, as do models of empirical transmit PDF traces. The received PDF is the convolution of the transmit PDF with the noise PDF, which can be calculated at receiver initialization for a given noise model and predefined set of noise power values or SNR granularity. They can be recalculated later if a different granularity is desired or if a new noise model is deemed more appropriate. The FFT-based fast convolution method works well for this approach.

Alternatively, if the system lends itself to description by closed-form equations, the received PDF can be calculated directly from the transmit PDF and noise PDF models via these equations (as discussed below in step 132 of FIG. 3). These can then be stored in the lookup table for any desired granularity and changed at will. In spite of its generality, the lookup table approach has some limitations. The predetermined granularity could limit the precision of the average SNR estimate by providing instantaneous estimates that have too great a sample-to-sample variance to be adequately smoothed by the running average calculation, or by jumping over features in the PDF vs. SNR functions such as peaks and valleys that would be captured by a continuous estimation process. The basic form of the largest valued selection block in FIG. 2 returns the globally most probable SNR value when a local solution may be more appropriate, although this concern can be addressed algorithmically. This lookup table approach is also memory intensive. However, a lookup table approach remains a feasible choice for systems without a closed-form equation representation that would enable a continuous SNR estimation capability.

Figure 3:
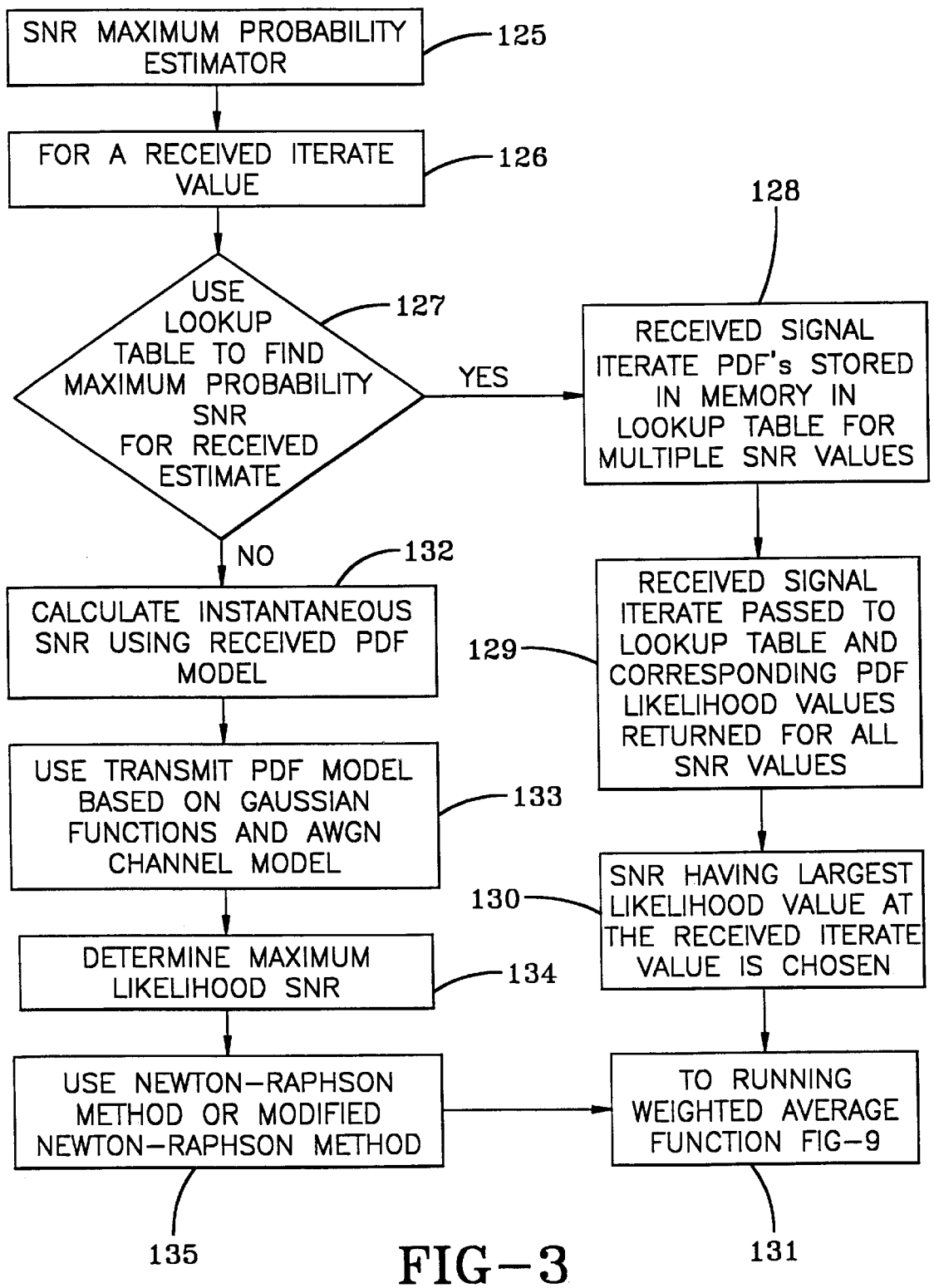
FIG. 3 is a flowchart of the SNR maximum likelihood estimator.
Figure 9:
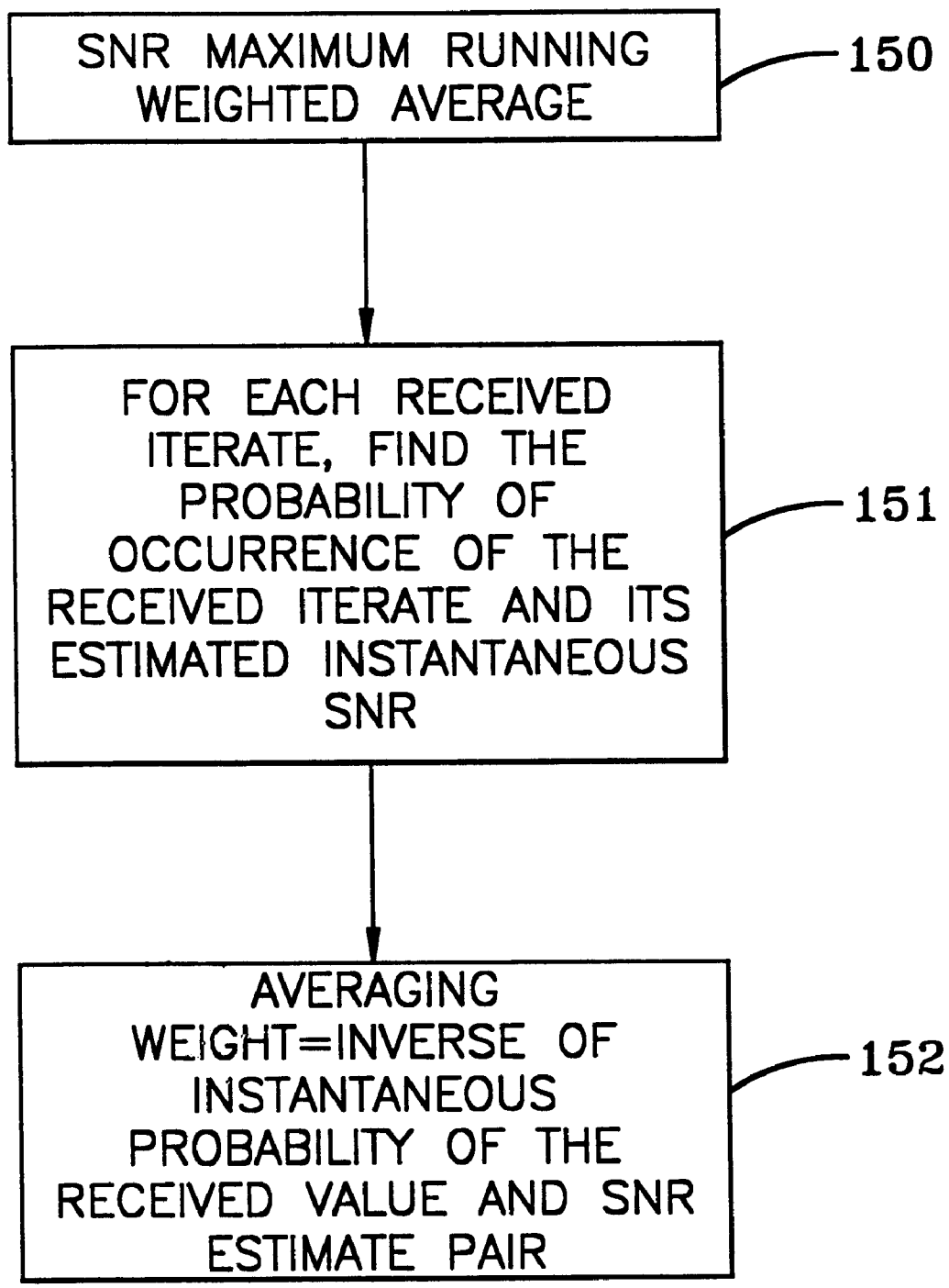
FIG. 9 shows a flowchart of calculating the SNR running weighted average.

Turning now to FIG. 3, a flowchart is shown of the SNR maximum probability estimator 125 (101 in FIG. 1). The signal transmission is a data sequence comprising N number of iterates where the first iterate represents a first value in the data sequence and the Nth iterate represents a last value in the data sequence. For a received signal iterate value 126, a lookup table can be used to find the maximum probability SNR for a received iterate 127. The lookup table contains received signal PDFs that have been stored in memory 128. The received signal iterate value is passed into the lookup table and the corresponding PDF value is returned 129 for all SNR values. The SNR having the largest PDF value associated with the received value is chosen 130. The individual iterate decisions are then smoothed through a running average calculation 131 as shown in FIGS. 1 and 9.

Alternatively, as shown in step 132 of FIG. 3, the instantaneous SNR may be calculated rather than using a lookup table. An algorithm is used and is based on the closed-form equations realized for the received PDF. The model chosen for the transmit PDF is based on Gaussian functions with an AWGN channel model 133. The received PDF is the convolution of the transmit PDF with the channel noise PDF 134, and the convolution of a Gaussian function with another Gaussian function is a Gaussian function. This closed-form representation enabled the development of the computational algorithm for the determination of the instantaneous maximum probability SNR.

Two possible models were generated, one with a windowed DC level plus a summation of infinite-domain Gaussian functions and another with a windowed DC level plus a summation of windowed (limited-domain) Gaussian functions. Here, the decision was made to use the transmit PDF model that windows only the DC component and not the Gaussian functions. Although both transmit PDF models result in closed-form expressions for the received PDF, the version that windowed all terms had significantly more complicated expressions involving the evaluation of Q-functions in all terms plus exponential functions in most terms. The version that windowed only the DC component had two Q-functions for the windowed DC term, with the transmit PDF Gaussian terms remaining Gaussian in the received PDF.

The calculation of Q-functions is computationally more expensive than the evaluation of Gaussian functions, even when a Q-function approximation formula is used. This additional complexity is easily seen by comparing the general Gaussian equation in equation (10) with the integrated Gaussian structure of the Q-function definition equation (16) and the extra terms preceding the Gaussian function in the Q-function approximation equation (17). The equation for the transmit PDF approximation model 133 is $$\tilde{p}_t(x) = cW_{dc}(x) + \sum_{l=1}^{L} \frac{b_l}{\sqrt{2\pi}\,\sigma_l} e^{-\left(\frac{x-m_l}{\sqrt{2}\,\sigma_l}\right)^2} \quad (1)$$

with $$W_{dc}(x)=U(x-(-H_{max}))-U(x-H_{max})=U(x-(-1.2854))-U(x-1.2854) \quad (2)$$

where $$U(x-x_0) = \begin{Bmatrix} 0 \Rightarrow x < x_0 \\ 1 \Rightarrow x \geq x_0 \end{Bmatrix}$$

= the unit step function and $H_{max}$=12854 is the maximum Henon magnitude for the specified bin structure.

The received data PDF is the convolution of the transmit PDF and the PDF of the additive noise in the channel. In the general case of a received PDF without closed form representation, the FFT-based fast convolution technique can be used to find the received PDF for any SNR value and any combination of transmit and noise PDF waveforms. It is therefore important to define the bin range with a sufficient region of insignificant values to make the aliasing contamination of the desired linear convolution result caused by the inherent circular convolutional characteristic of the FFT-based method negligible. In addition, the greatest computational efficiency of the FFT is realized when its input data length is a power of 2. Therefore, the number of bins should be equal to a power of 2 to facilitate efficient FFT-based fast convolution in the general case. Zero-padding can also be used to address the circular convolution concern. However, the increased lengths of the FFT calculations load down the computer system resources if 4096 bins are spread over a smaller range of received values such that zero padding is required, and the calculation fidelity decreases if fewer bins are used over the range of significant values.

In the present implementation example, the bin value range was set to [−5.12, 5.12] based on transmit PDF, anticipated OdB SNR worst case, and need for sufficient number of bins with insignificant content to minimize the linear convolution contamination from the inherently circular convolutional process of FFT-based fast convolution. The number of bins was chosen to be 4096, which was selected as a tradeoff between fidelity, computational resources, and speed. The bin range [−512, 5.12] and 4096 bins yields a bin width of 1/400, or 0.0025, and a bin density of 400 $^{bins}/_{UnitRange}$. To empirically find the many PDFs in this investigation, the MATLAB histogram function was used for each PDF calculation to get the number of occurrences in the time series that fell into the range of numbers for each data bin.

Letting b=bin index

B=number of data bins

K=number of iterates in the time series $_b$n=number of hits in data bin b $_b$r=relative number of occurrences in data bin b w=bin width, which is constant for all bins p=continuous probability density function $_b$p=PDF value of data bin b (quantized probability density function)

P=probability $$_b r = \frac{_b n}{K} \quad (3)$$

where $$\sum_{b=1}^{B} {_b n} = K \quad (4)$$

and $_b$n is found easily by using MATLAB's histogram function.

The fundamental definition of PDF requires that $$P_\infty = \int_{-\infty}^{\infty} (p(x))dx = 1. \quad (5)$$

For the present formulation, this translates into the requirement $$\sum_{b=1}^{B} {_b p w} = 1. \quad (6)$$

The PDF can be found from the relative number of occurrences as follows:

$$\sum_{b=1}^{B} {_b r} = \sum_{b=1}^{B} \frac{_b n}{K} = \frac{K}{K} = 1 \quad (7)$$

$$\sum_{b=1}^{B} {_b p w} = w \sum_{b=1}^{B} {_b p} = \sum_{b=1}^{B} {_b r} \quad (8)$$

$$_b p = \frac{_b r}{w}. \quad (9)$$

The channel noise PDF is modeled as $$p_n(x) = \frac{1}{\sqrt{2\pi}\,\sigma_n} e^{-\left(\frac{x}{\sqrt{2}\,\sigma_n}\right)^2} \quad (10)$$

The received PDF model 133 is found by the convolution of the transmit PDF model with the noise PDF model $$\tilde{p}_r(x) = \tilde{p}_t(x) * p_n(x) \quad (11)$$

$$\tilde{p}_r(x) = \int_{-\infty}^{\infty} \tilde{p}_t(y) p_n(x-y)\,dy \quad (12)$$

$$\tilde{p}_r(x,\sigma_n) = \int_{-\infty}^{\infty}\left\{\left(cW_{dc}(y) + \sum_{l=1}^{L} \frac{b_l}{\sqrt{2\pi}\,\sigma_l} e^{-\left(\frac{y-m_l}{\sqrt{2}\,\sigma_l}\right)^2}\right)\right.$$
$$\left.\left(\frac{1}{\sqrt{2\pi}\,\sigma_n} e^{-\left(\frac{x-y}{\sqrt{2}\,\sigma_n}\right)^2}\right)\right\}dy \quad (13)$$

where $$\sigma_n^2 = \frac{s}{s_{nr}} = \text{noise variance} = \text{noise power}$$

=noise variance=noise power s=signal power $s_{nr}$=signal-to-noise ratio (SNR)

$\tilde{p}_r(x,\sigma_n)=\tilde{p}_r(x,s_{nr})$=a function of both the received value and the noise power.

Carrying the SNR variable explicitly because it is the quantity of interest yields $$\tilde{p}_r(x,s_{nr}) = \alpha(x,s_{nr}) + \beta(x,s_{nr}) \quad (14)$$

where $$\alpha(x,s_{nr}) = \int_{-\infty}^{\infty}\left\{(cW_{dc}(y))\left(\frac{1}{\sqrt{2\pi}\,\sigma_n} e^{-\left(\frac{x-y}{\sqrt{2}\,\sigma_n}\right)^2}\right)\right\}dy$$

$$\beta(x,s_{nr}) = \int_{-\infty}^{\infty}\left\{\left(\sum_{l=1}^{L} \frac{b_l}{\sqrt{2\pi}\,\sigma_l} e^{-\left(\frac{y-m_l}{\sqrt{2}\,\sigma_l}\right)^2}\right)\left(\frac{1}{\sqrt{2\pi}\,\sigma_n} e^{-\left(\frac{x-y}{\sqrt{2}\,\sigma_n}\right)^2}\right)\right\}dy$$

The first term is integrated with a standard change of variables as $$\alpha(x,s_{nr}) = c\left[Q\left(\frac{-H_{max}-x}{\sigma_n}\right) - Q\left(\frac{H_{max}-x}{\sigma_n}\right)\right] \quad \sigma_n^2 = \frac{s}{s_{nr}} \quad (15)$$

where $$Q(\gamma) = \frac{1}{\sqrt{2\pi}} \int_{\gamma}^{\infty} e^{-\frac{1}{2}\gamma^2}\,d\gamma \quad (16)$$

An approximation to the Q-function has been found that reduces the computation time by a factor of 2 over the MATLAB built-in error function (erf), which is related to the Q-function by a scale factor and change of variable. The approximation is $$Q(x) \cong \left[\frac{1}{\left(1-\frac{1}{\pi}\right)x + \frac{1}{\pi}\sqrt{x^2+2\pi}}\right]\frac{1}{\sqrt{2\pi}} e^{-\frac{x^2}{2}} \quad (17)$$

and is accurate to within 1.5% across the entire range of x. Its use in the simulations helped control data run times.

The approximation has 1–1.5% accuracy for the argument in the range [0.3–1.2]. Closer to zero and greater than 1.2 yield more accurate approximations, asymptotically approaching zero error in both directions. For the windowed DC implementation here, the Q-function is used only in the first term of equation (14), where the positive argument shown in equation (15) results in the 1–1.5% error for the range $$0.3 < \frac{H_{max}-x}{\sigma_n} < 1.2$$

$$H_{max} - 1.2\sigma_n < x < H_{max} - 0.3\sigma_n.$$

Since Q(−x)=1−Q(x), the greatest inaccuracy is also in the range $$1.2\sigma_n - H_{max} > x > 0.3\sigma_n - H_{max}.$$

The inaccuracy occurs in like manner for the other edge of the DC window. It is most pronounced just inside and outside the edges of DC window, and has greater contribution with larger channel noise power. The second term in the received PDF closed-form model equation (14) is exact, and reduces the contribution of the Q-function error to the received PDF convolution result.

The equation for the second term is solved using the result tabulated in a mathematical reference book, $$\int_{-\infty}^{\infty} e^{(-p^2 x^2 \pm qx)}\,dx = e^{\frac{q^2}{4p^2}} \frac{\sqrt{\pi}}{p} \quad p > 0 \quad (18)$$

which results in $$\beta(x,s_{nr}) = \sum_{l=1}^{L} \frac{b_l}{\sqrt{2\pi}\,\sigma_{nl}} e^{-\left(\frac{x-m_l}{\sqrt{2}\,\sigma_{nl}}\right)^2} \quad (19)$$

where $\sigma_{nl}^2 = \sigma_n^2 + \sigma_l^2$ and $\sigma_n^2 = s/s_{nr}$. The convolution of Gaussian functions results in a Gaussian function whose variance (power) is equal to the sum of the constituent variances (powers), which is a well-known result in probability theory.

FIGS. 4a and 4b and 5a and 5b illustrate the effectiveness of these equations in calculating PDF traces for 6 & 15 dB SNR and 30 & 60 dB SNR, respectively. In all cases, the top plot is an empirical data run of 1,000,000 iterates, the middle plot is the convolution result plotted from the equation $$\tilde{p}_r(x,s_{nr}) = \alpha(x,s_{nr}) + \beta(x,s_{nr}), \quad (20)$$

and the bottom plot is the superposition of the two.

Turning back to FIG. 3, the next step is to determine the maximum likelihood SNR 134. The basics of this method draw on the observation that the received probability $\tilde{p}_r(x,s_{nr})$ is a function of two variables, x and $s_{nr}$. It is not a joint probability function because only the function of x is a PDF with unity area (slices of constant $s_{nr}$), while the function of $s_{nr}$ has unbounded area (slices of constant x).

Figure 4A:
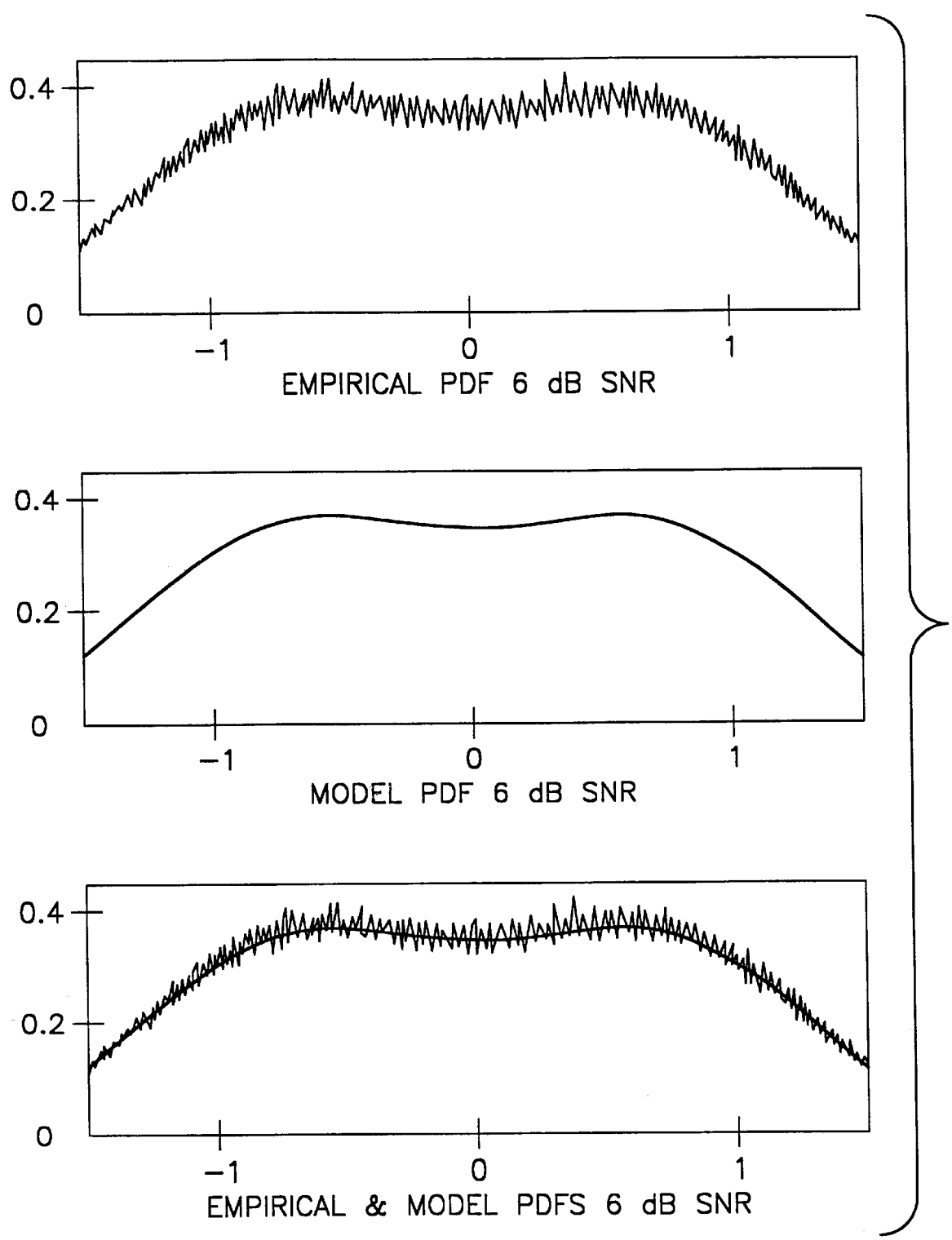
FIG. 4a shows plots of the PDF traces for an SNR of 6 dB.
Figure 4B:
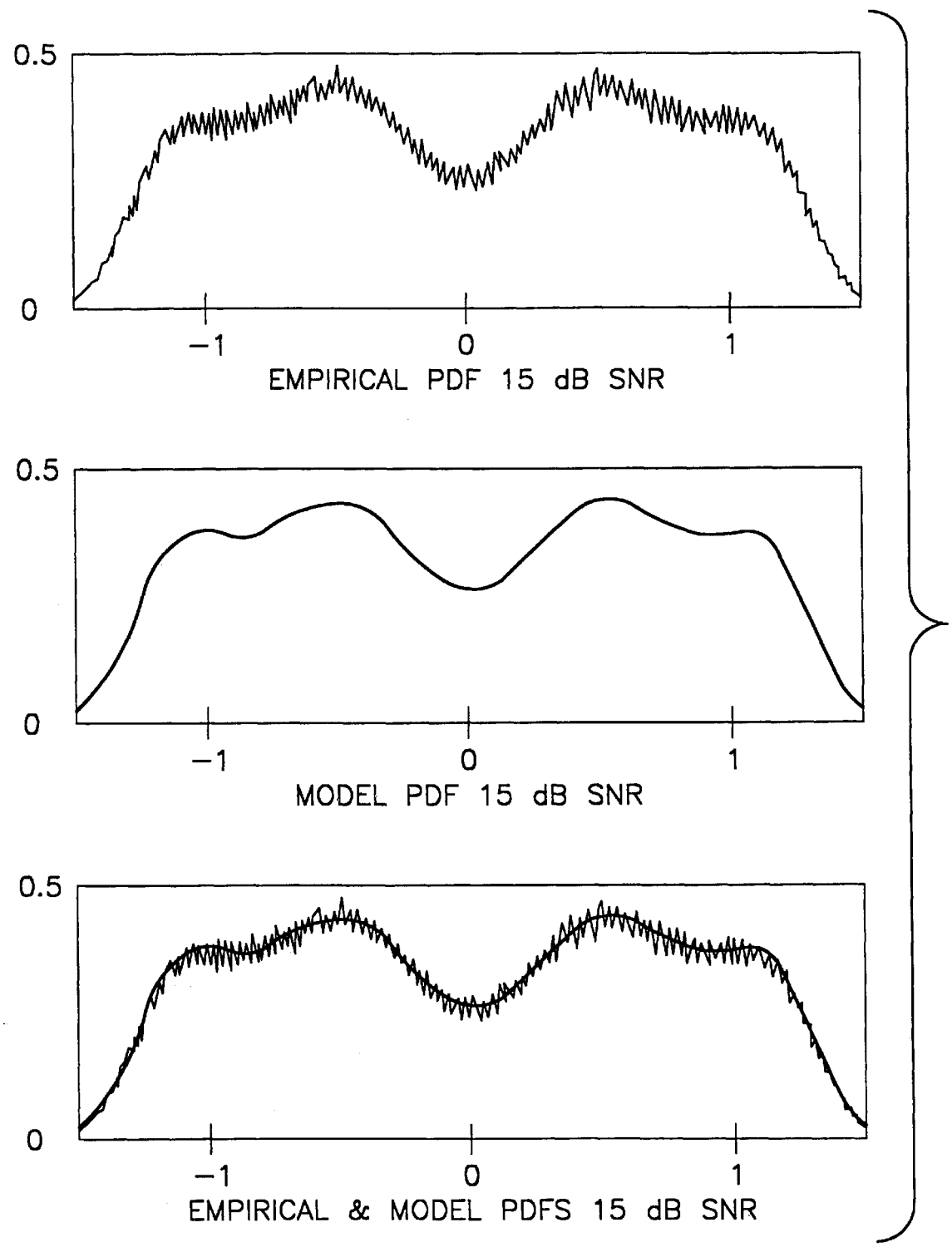
FIG. 4b shows plots of the PDF traces for an SNR of 15 dB.
Figure 5A:
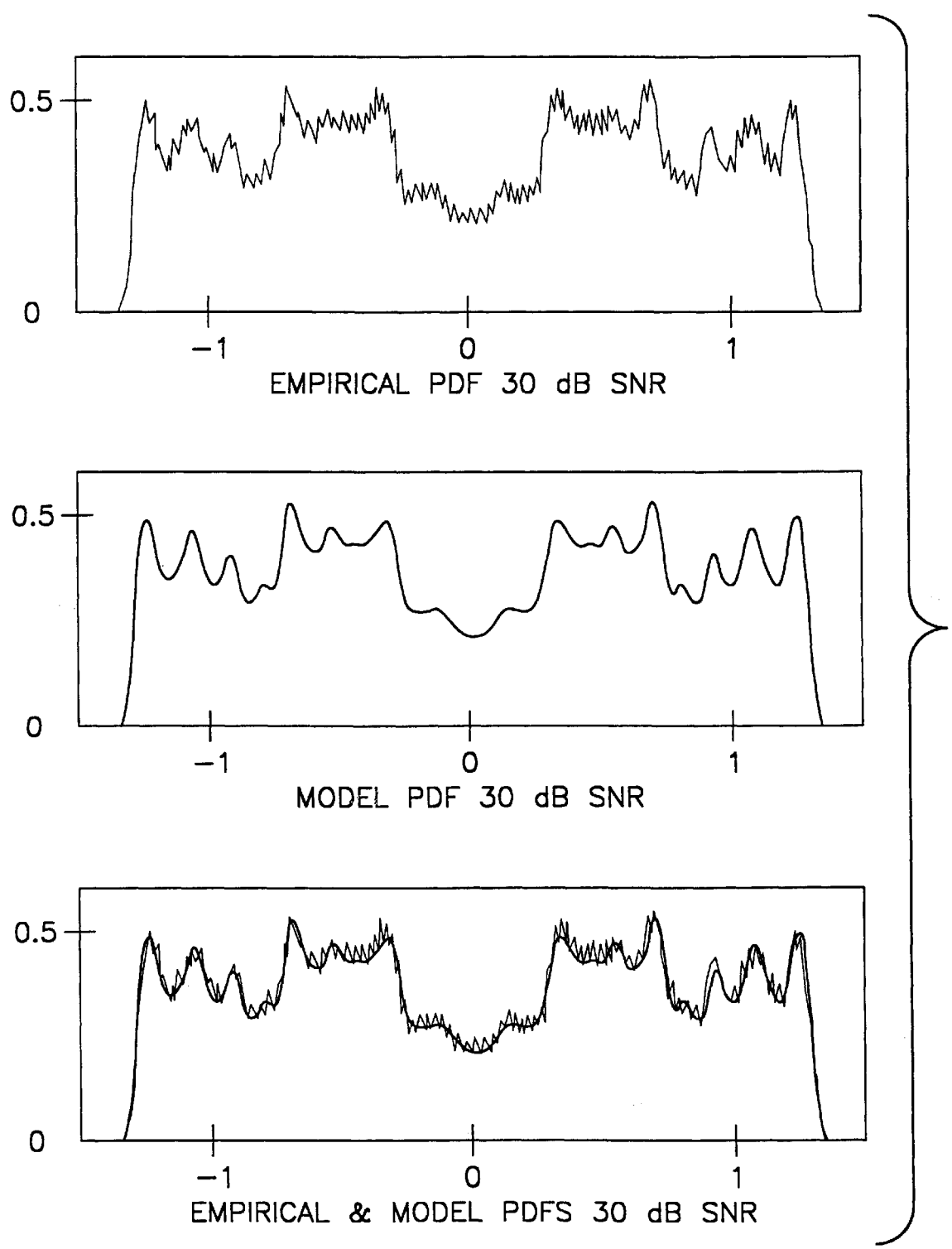
FIG. 5a shows plots of the PDF traces for an SNR of 30 dB.
Figure 5B:
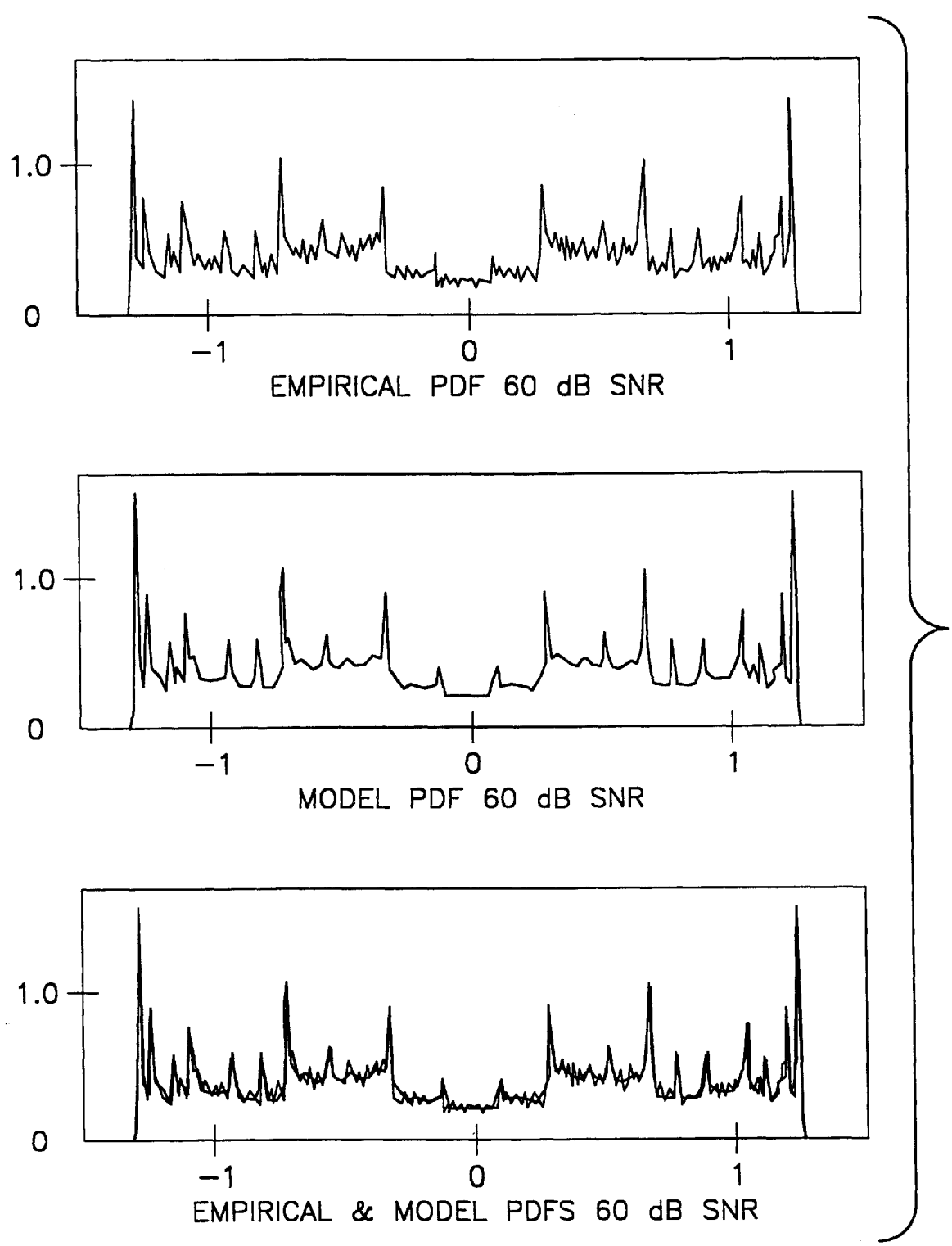
FIG. 5b shows plots of the PDF traces for an SNR of 60 dB.

FIGS. 4a and b and 5a and b showed the x dependency, which are PDFs.

Figure 6:
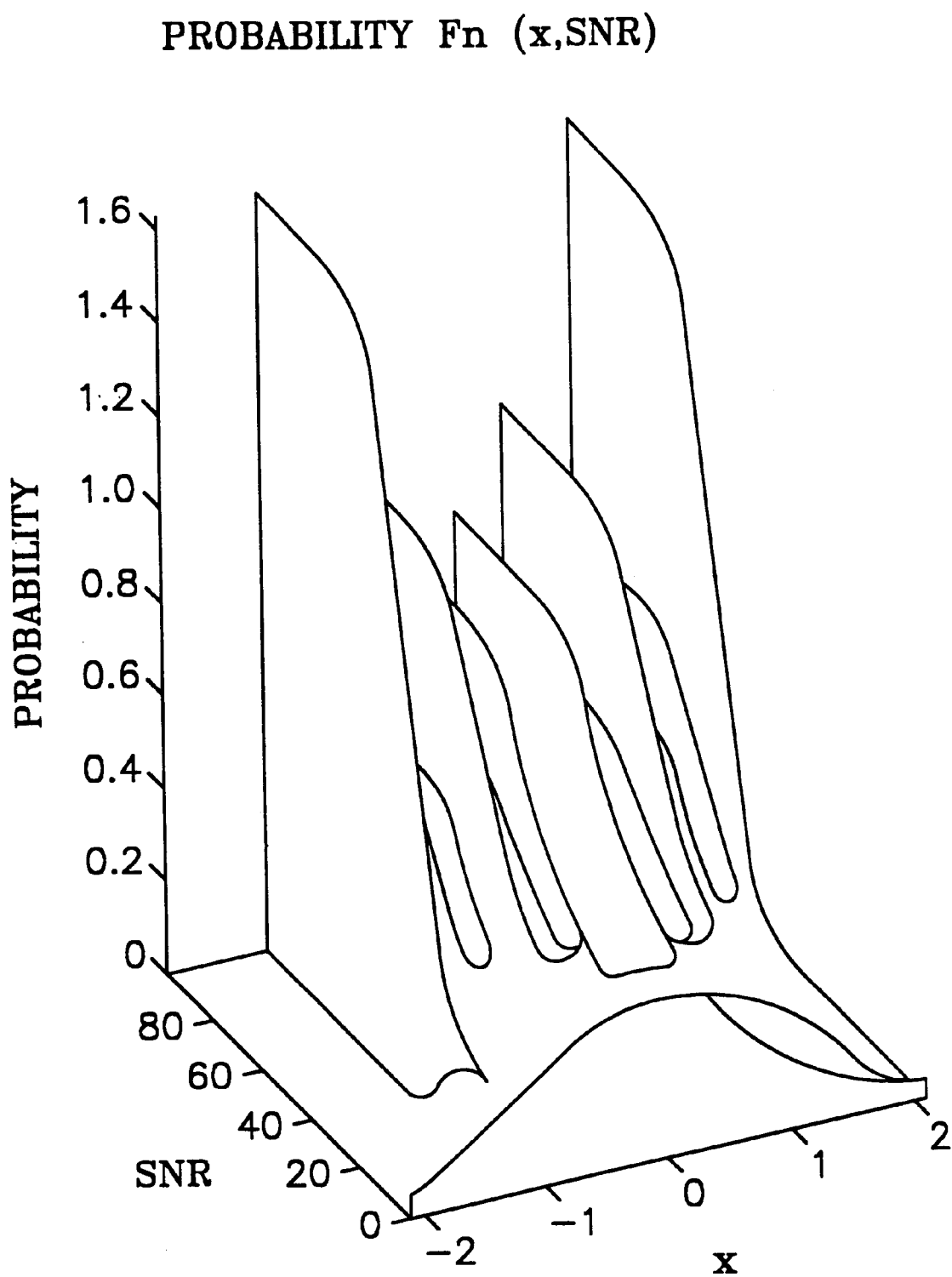
FIG. 6 is a plot of a two dimensional probability function at about 30° rotation and 120° elevation.
Figure 7:
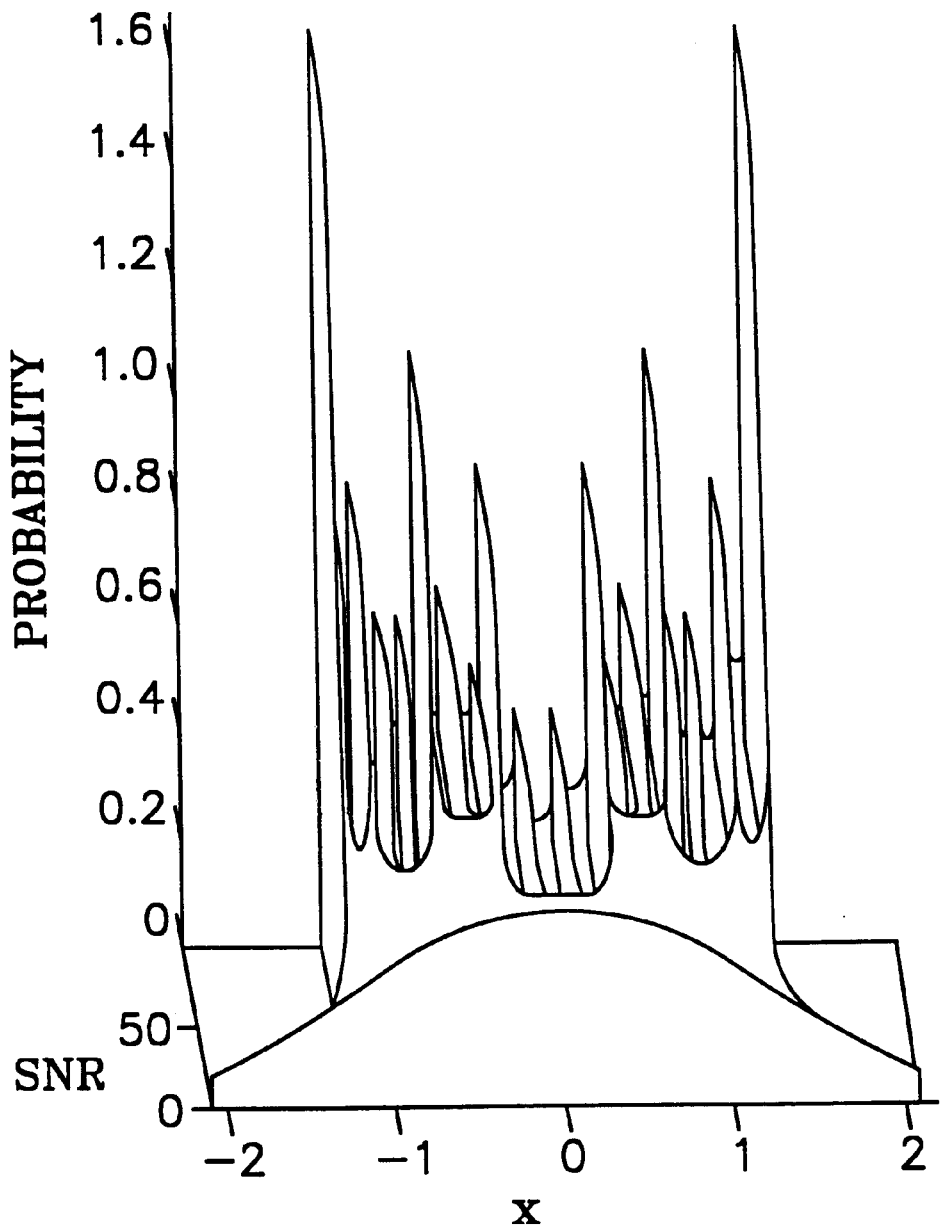
FIG. 7 is a plot of a two dimensional probability function at about 5° rotation and 10° elevation.
Figure 8:
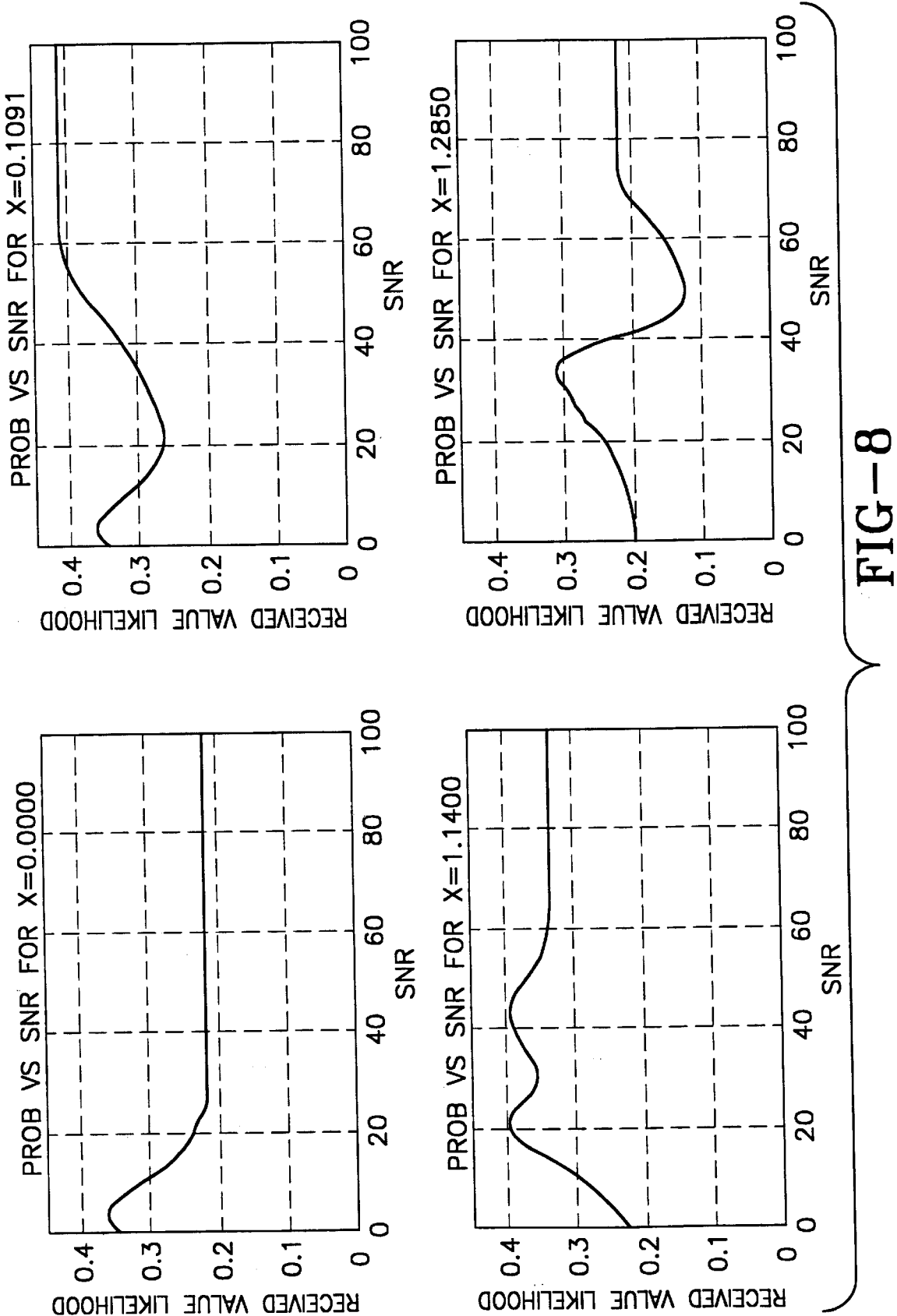
FIG. 8 shows a plot of received PDF dependency on SNR for various received iterate values.

Plots of the two-dimensional function are shown in FIGS. 6 and 7, with slightly different angles of observation to highlight the variations in the functions with $s_{nr}$ and enable good views of the peaks and valleys of the surface topology. These peaks and valleys became an important feature in the determination of the average SNR estimate. FIG. 8 illustrates examples of the PDF dependency on SNR for various values of the received iterate. These shapes are continuous and vary smoothly with SNR, which opened the possibility of an algorithmic method of solving for the maximum probability point to determine the corresponding SNR as the desired instantaneous value. The preferred method will be fast and respond only to maxima. In addition, the question of choosing local or global solutions arises in situations with more than one peak, as well as traces with two identical peaks that must be addressed.

Turning back to FIG. 3, the next step in the SNR maximum probability estimation is to use either the Newton-Raphson method or the modified Newton-Raphson method to determine the maximum probability SNR 135. The Newton-Raphson iterative root approximation optimization technique was targeted for the algorithm because it converges quadratically to a solution, while all other possibilities such as bisection, secant, and regula-falsi converged linearly or slightly better than linearly. The Newton-Raphson technique finds the zeros of a function and converges to local solutions or diverges depending on its initial estimate and the correction step size.

The Newton-Raphson method operates on functions expressed as $f(x_{sol})=0$, and requires the derivative of the function in its approximation correction process. Its iterated equation is $$x_{j+1} = x_j - \frac{f(x_j)}{f'(x_j)} \quad (21)$$

where j=the iterate counter $x_j$=the current approximation $f(x_j)=[f(x)]_{x=x_j}$ $$f'(x_j) = \left[\frac{df(x)}{dx}\right]_{x=x_j}$$

$x_{j+1}$=the next approximation

At $x=x_{sol}$, $f(x_{sol})=0$ and $x_{j+1}=x_j=x_{sol}$ and the iteration is complete.

Convergence of this method is not guaranteed and generally depends on the initial estimate and the step size that is calculated from the function and its derivative on each iterate. This method will find any zero of the function that is close enough to its initial value and has a well-behaved sequence of correction calculations. Any solution point can be viewed from the standard nonlinear dynamical perspective as a fixed point of the iterative process. For a communication system based on chaos, correction steps that are large enough to move the next approximation out of the basin of attraction for a given solution will cause the iterative procedure to diverge from that point.

The function with zeros that the Newton-Raphson method solves for can be the derivative of another function, for example (cf. equation 14)

$$f(s_{nr}) = \frac{d[\tilde{p}_r(x, s_{nr})]}{ds_{nr}} \quad (22)$$

The solutions $f(s_{nr_{sol}})=0$ in this case correspond to the maxima, minima, and points of inflection for the probability function of SNR for a given received value, where its first derivative is zero.

Alternatively, the modified Newton-Raphson technique may be used to determine the maximum probability SNR 135 by adapting the Newton-Raphson technique to this design via three main modifications to control its functional characteristics. The first modification causes it to find only the maxima of the probability function of SNR based on the fact that the second derivative of a function identifies its concave down (maximum) or concave up (minimum) characteristic. The second change limits the maximum correction per step in order to avoid jumping over maxima without detecting them. And finally, the computed step size is multiplied by a factor that toggles between two values to prevent a period two fixed point of the iterative process spanning a peak and causing detection failure. Other standard programming techniques such as limiting the number of iterations allowed in each execution, hard programming upper and lower $s_{nr}$ range limits, protecting against a zero denominator, and early loop termination via testing each new approximation for proximity to the current value round out its implementation.

The Newton-Raphson equation expressed as functions of the probability function SNR is $$s_{nr_{j+1}} = s_{nr_j} - \frac{\left[\frac{d[\tilde{p}_r(x, s_{nr})]}{ds_{nr}}\right]_{s_{nr_j}}}{\left[\frac{d^2[\tilde{p}_r(x, s_{nr})]}{ds_{nr}^2}\right]_{s_{nr_j}}} \quad (23)$$

The derivative in the numerator is carried out below, and the fact that it equals zero at the solution allows a term to be dropped that simplifies the second derivative in the denominator. The correction term actually used is, therefore, not exactly as specified in equation (23), and so the notation will be changed to reflect this.

Let $$s_{nr_{j+1}} = s_{nr_j} - \frac{f(s_{nr_j})}{f'(s_{nr_j})} \quad (24)$$

where $$f(s_{nr}) \propto \frac{d[\tilde{p}_r(x, s_{nr})]}{ds_{nr}} \quad \text{and}$$

$$f'(s_{nr}) = \frac{df(s_{nr})}{ds_{nr}} \propto \frac{d^2[\tilde{p}_r(x, s_{nr})]}{ds_{nr}^2}$$

Differentiating equation (14)

$$\frac{d[\tilde{p}_r(x, s_{nr})]}{ds_{nr}} = \frac{d[\alpha(x, s_{nr})]}{ds_{nr}} + \frac{d[\beta(x, s_{nr})]}{ds_{nr}} \quad (25)$$

From equation (15)

$$\frac{d\alpha(x, s_{nr})}{ds_{nr}} = \qquad (26)$$

$$c\left[\frac{d}{d\sigma_n}\left\{Q\left(\frac{-H_{max}-x}{\sigma_n}\right)\right\}\frac{d\sigma_n}{ds_{nr}} - \frac{d}{d\sigma_n}\left\{Q\left(\frac{H_{max}-x}{\sigma_n}\right)\right\}\frac{d\sigma_n}{ds_{nr}}\right]$$

The differentiation of the Q-function was done using the Liebniz rule $$\frac{d}{dy}\left[\int_{s(y)}^{r(y)} p_X(x)dx\right] = p_X(r(y))\frac{dr(y)}{dy} - p_X(s(y))\frac{ds(y)}{dy}. \qquad (27)$$

The result was verified with the following equation $$\frac{d}{dx}\mathrm{erf}(x) = \frac{2}{\sqrt{\pi}}e^{-x^2} \qquad (28)$$

and the relationship $$Q(x) = \frac{1}{2}\left[1 - \mathrm{erf}\left(\frac{x}{\sqrt{2}}\right)\right] \text{ as} \qquad (29)$$

$$\frac{d}{dx}Q(x) = -\frac{1}{\sqrt{2\pi}}e^{-\frac{x^2}{2}} \qquad (30)$$

So $$\frac{d\alpha(x, s_{nr})}{ds_{nr}} = \left(\frac{1}{\sqrt{2\pi}\,s_{nr}}\right) \qquad (31)$$

$$\left(\frac{c}{\sqrt{2}}\right)\left[\left(\frac{H_{max}-x}{\sqrt{2}\,\sigma_n}\right)e^{-\left(\frac{H_{max}-x}{\sqrt{2}\,\sigma_n}\right)^2} + \left(\frac{H_{max}+x}{\sqrt{2}\,\sigma_n}\right)e^{-\left(\frac{H_{max}+x}{\sqrt{2}\,\sigma_n}\right)^2}\right]$$

Carrying out the differentiation for the second term of equation (25), using equation (19)

$$\frac{d\beta(x, s_{nr})}{ds_{nr}} = \sum_{l=1}^{L}\left\{\frac{d}{d\sigma_{nl}}\left[\frac{b_l}{\sqrt{2\pi}\,\sigma_{nl}}e^{-\left(\frac{x-m_l}{\sqrt{2}\,\sigma_{nl}}\right)^2}\right]\left(\frac{d\sigma_{nl}}{d\sigma_n}\right)\left(\frac{d\sigma_n}{ds_{nr}}\right)\right\} \qquad (32)$$

$$= \left(\frac{1}{\sqrt{2\pi}\,s_{nr}}\right)\left(\frac{\sigma_n^2}{2}\right)\sum_{l=1}^{L}\left\{b_l e^{-\left(\frac{x-m_l}{\sqrt{2}\,\sigma_{nl}}\right)^2}\left(\frac{1}{\sigma_{nl}^3}\right)\left(1 - \left(\frac{x-m_l}{\sigma_{nl}}\right)^2\right)\right\} \qquad (33)$$

Both terms of the differentiation for the Newton-Raphson correction term numerator have been found. Setting the numerator equal to zero allows the elimination of one $s_{nr}$ term, which simplifies the next differentiation for the denominator of the correction term. It is possible to form the total correction shown in equation (24) prior to simplification, but the leading term eliminated now because of numerator equality to zero contains the variable $s_{nr}$, which would enter into the differentiation process and result in more complicated equations. The notation change is shown below.

$$\left[\frac{d[\tilde{p}_r(x, s_{nr})]}{ds_{nr}}\right]_{s_{nr_{sol}}} = \left[\frac{d[\alpha(x, s_{nr})]}{ds_{nr}}\right]_{s_{nr_{sol}}} + \left[\frac{d[\beta(x, s_{nr})]}{ds_{nr}}\right]_{s_{nr_{sol}}} = 0 \qquad (34)$$

Both of these terms have a common leading factor, which can be eliminated.

$$\left[\frac{d[\tilde{p}_r(x, s_{nr})]}{ds_{nr}}\right]_{s_{nr_{sol}}} = \qquad (35)$$

$$\left(\frac{1}{\sqrt{2\pi}\,s_{nr_{sol}}}\right)f1(s_{nr_{sol}}) + \left(\frac{1}{\sqrt{2\pi}\,s_{nr_{sol}}}\right)f2(s_{nr_{sol}}) = 0$$

Resulting in the new notation $$f(s_{nr}) = f_1(s_{nr}) + f_2(s_{nr}) = \sqrt{2\pi}\,s_{nr}\left[\frac{d[\tilde{p}_r(x, s_{nr})]}{ds_{nr}}\right] \qquad (36)$$

where $$f_1(s_{nr}) = \left(\frac{c}{2}\right)\left[\left(\frac{H_{max}-x}{\sigma_n}\right)e^{-\frac{1}{2}\left(\frac{H_{max}-x}{\sigma_n}\right)^2} + \left(\frac{H_{max}+x}{\sigma_n}\right)e^{-\frac{1}{2}\left(\frac{H_{max}+x}{\sigma_n}\right)^2}\right] \qquad (37)$$

$$f_2(s_{nr}) = \left(\frac{\sigma_n^2}{2}\right)\sum_{l=1}^{L}\left\{b_l e^{-\frac{1}{2}\left(\frac{x-m_l}{\sigma_{nl}}\right)^2}\left(\frac{1}{\sigma_{nl}^3}\right)\left(1 - \left(\frac{x-m_l}{\sigma_{nl}}\right)^2\right)\right\} \qquad (38)$$

The denominator in equation (24) becomes $$f'(s_{nr}) = f'_1(s_{nr}) + f'_2(s_{nr}) \qquad (39)$$

with $$f'_1(s_{nr}) = \left(\frac{1}{2s_{nr}}\right)\left(\frac{c}{2}\right)\left[\left(\frac{H_{max}-x}{\sigma_n}\right)e^{-\frac{1}{2}\left(\frac{H_{max}-x}{\sigma_n}\right)^2}\left\{1 - \left(\frac{H_{max}-x}{\sigma_n}\right)^2\right\} + \qquad (40)$$

$$\left(\frac{H_{max}+x}{\sigma_n}\right)e^{-\frac{1}{2}\left(\frac{H_{max}+x}{\sigma_n}\right)^2}\left\{1 - \left(\frac{H_{max}+x}{\sigma_n}\right)^2\right\}\right]$$

$$f'_2(s_{nr}) = \qquad (41)$$

$$\left(\frac{\sigma_n^2}{2s_{nr}}\right)\left(\frac{\sigma_n^2}{2}\right)\sum_{l=1}^{L}b_l e^{-\frac{1}{2}\left(\frac{x-m_l}{\sigma_{nl}}\right)^2}\left(\frac{1}{\sigma_{nl}^3}\right)\left\{\left(\frac{1}{\sigma_{nl}^2}\right)\left[3\left(1 - \left(\frac{x-m_l}{\sigma_{nl}}\right)^2\right) - 2\left(\left(\frac{x-m_l}{\sigma_{nl}}\right)^2\right)^2\right] - \frac{2}{\sigma_n^2}\left(1 - \left(\frac{x-m_l}{\sigma_{nl}}\right)^2\right)\right\}$$

The equations are now fully defined, and the algorithmic modifications can be made. Equation (24) is repeated below as the starting point, and depicts the Newton-Raphson method with attractive fixed points at all maxima, minima, and points of inflection for the probability function $\tilde{p}_r(x, s_{nr})$ $$s_{nr_{j+1}} = s_{nr_j} - \frac{f(s_{nr_j})}{f'(s_{nr_j})} \qquad (42)$$

The minima have a concave up structure with a positive second derivative of $\tilde{p}_r(x, s_{nr})$, while the maxima have a concave down structure and a negative second derivative. The same holds true for the corresponding portions of a point of inflection in that the side leading up into the point is concave down and the side leading up away from the point is concave up. A simple test prior to the execution of equation (42) turns the minima into repelling fixed points, while maintaining the maxima as attractive fixed points.

If $f'(s_{nr_j}) > 0$  % Concave up-minima  (43)

$f'(s_{nr_j}) = -f'(s_{nr_j})$  % Negates correction direction

% therefore pushes away from minima end $$s_{nr_{j+1}} = s_{nr_j} - \frac{f(s_{nr_j})}{f'(s_{nr_j})}$$

It was found that the maximum probability algorithm performed better when working with SNR values expressed as dB) rather than ratios. Although the typical calculation method is to work with power ratios and convert results to dB, the traces shown in FIG. 8 have an intuitively good appearance similar to polynomial curves on a dB SNR scale, so the various considerations are expressed in dB for this situation.

A set of maximum step criteria was established to avoid jumping over maxima without detecting them. A sliding maximum step was used because the areas of these traces that showed little or no activity could tolerate larger steps than those areas with a lot of peaks and valleys, and maximized the efficiency of the algorithm at locating the peaks. The sliding maximum step sizes and their regions of definition are shown in Table 1.

TABLE 1

| SNR Values | Max Step Size |
|---|---|
| 0–10 dB | 5 dB |
| 10–20 dB | 5 + 1.5 dB |
| 20–30 dB | 5 + 2(1.5) dB |
| 30–40 dB | 5 + 3(1.5) dB |

The maximum step size is multiplied at each pass by a variable that toggles between the values of 1 and $$\sqrt[5]{\frac{1}{2}} = 0.8706,$$

which is an empirically determined value. The choice to use roots of ½ as candidates for a suitable step size modification was one of convenience because the various roots yielded conveniently spaced possibilities. A number of other selection methods would have worked as well. The dual step size technique avoided the situation of a period two fixed point causing the algorithm to perpetually span the desired maximum point without ever finding it within the SNR range of a given maximum step size. Care was required at the crossover points of the sliding maximum steps that were used, where the wrong choice of toggle multiplier could map the larger range exactly into the smaller and cause algorithm failure due to a period two fixed point.

The detection rails were set at 0 dB and 100 dB SNR, which were the expected minimum SNR of performance and essentially no noise, respectively. Next approximation values that exceeded these limits were adjusted, so instantaneous SNR values are always within this range. These were chosen prior to completion of the receiver design and the subsequent evaluation of its performance, and especially the 0 dB minimum SNR may be a good subject for further investigation.

At the completion of the Newton-Raphson computation, the instantaneous maximum probability SNR estimate for iterate k has been found.

$$s_{nr}[k] = s_{nr_{sol}} = [s_{nr_{j+1}}]_{\{|s_{nr_{j+1}} - s_{nr_j}| < \varepsilon\}} \quad (44)$$

where $\varepsilon$ = desired accuracy

Turning back to FIG. 1, the next step in the receiver estimation engine processing is to calculate the running weighted average 103. FIG. 9 shows a flowchart of calculating the SNR running weighted average. Combining the instantaneous SNR estimates on every received iterate into an average value that accurately tracks the true value is accomplished by a running weighted average calculation whose weights are derived from probability computations so the estimated SNR tracks the true SNR closely. The current received iterate and the corresponding instantaneous SNR estimate are processed to find their probability of occurrence 102. The bin width w is ignored because it is the same for all bins in the PDF model and contributes nothing to the decision process. Only the bin values of the PDF functions will be used in the weighted averaging process and will be loosely referred to as the probability. For the SNR running weighted average 150, for each received iterate, the SNR is estimated, and the probability of occurrence is found for the (received value, SNR estimate) pair 151. These values correspond to a point in the two-dimensional probability function shown in FIGS. 6 and 7. Both the received value and the SNR estimate will change for every iterate, so the instantaneous probability moves with respect to both axes on every calculation.

In order for the estimated SNR to track the true SNR, the averaging weights are defined as the inverse instantaneous probability of the (received value, SNR estimate) pair (FIG. 9, 152)

$$P_i[k] = \tilde{p}_r(x[k], s^3_{nr}[k]) \quad (45)$$

$$w_{av}[k] = \frac{1}{P_i[k]}. \quad (46)$$

Two considerations for calculating the weighting factors are avoiding division by zero and limiting the maximum weight. Observed probabilities of zero within the resolution of MATLAB did happen, and the probability result is now restricted to a minimum value of $10^{-10}$ to avoid division by zero. The maximum weight calculation limits the amount of emphasis put on the very low probability values so that their inverses do not swamp the average, and was derived from the observed average probability and the averaging window length.

$$\overline{P}_i = 0.4444$$

$$w_{max} = \frac{1}{\overline{P}_i} \frac{W_{ra}}{f_W} \quad (47)$$

where $W_{ra}$=the running average window length and $f_{W=}3$, an empirical factor.

Figure 10:
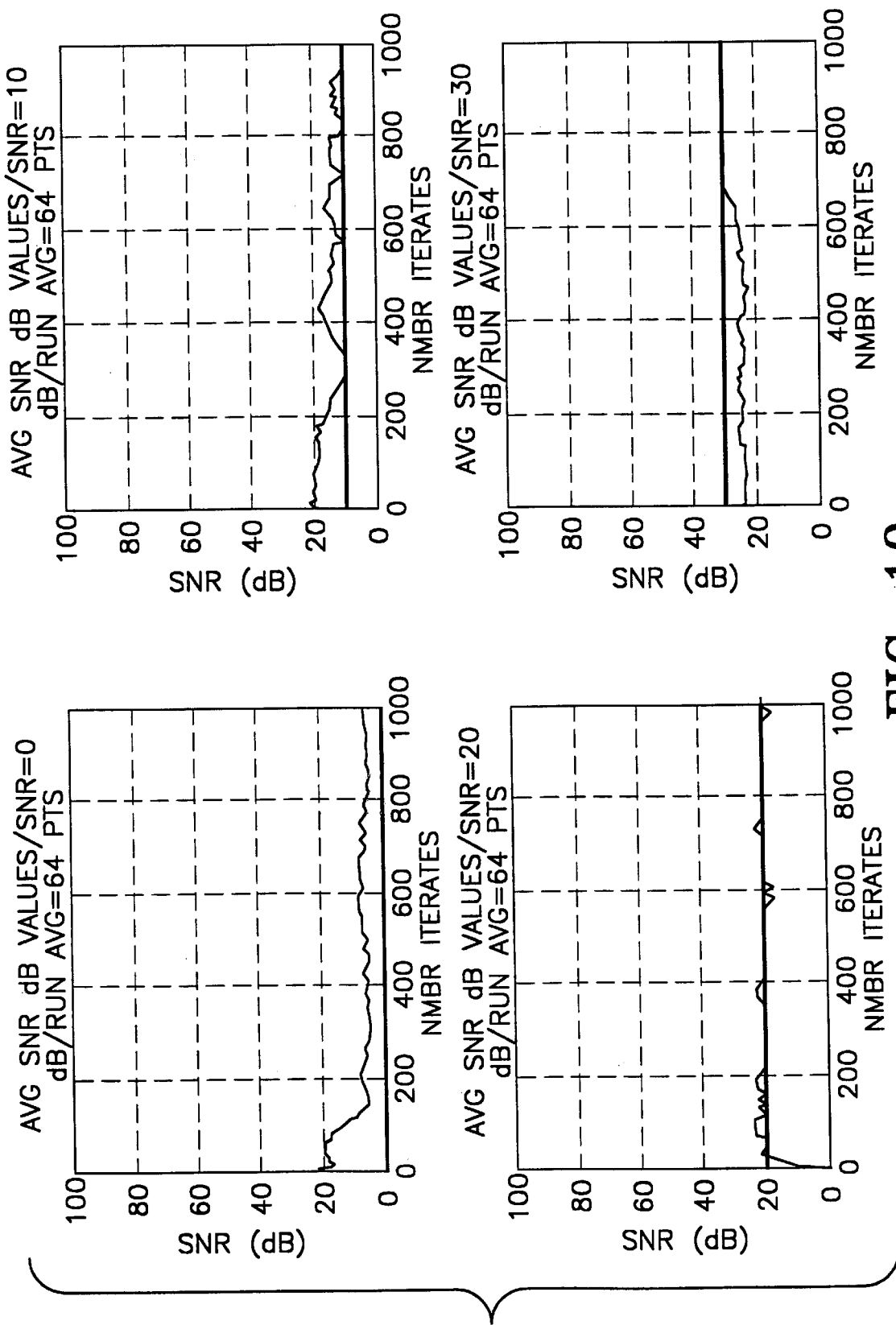
FIG. 10 is a plot of the SNR estimator performance for a 64 iterate window.

Data was taken for various combinations of variables, and the empirical factor value of three was found to yield good results. Averaging window lengths of 8 and 16 are responsive to changes in channel conditions but have a grassy appearance with some areas of significant discrepancy between the estimated SNR and the true SNR. Windows of 32 and 64 iterates showed smoother traces with better estimate tracking. This simulation was done with a 64-iterate window, and examples of its performance are shown in FIG. 10. In FIG. 10, it can be seen that the running weighted average SNR locks onto a close estimate of the true SNR within approximately 200 iterates for a 64-iterate window. The traces have some variation because they are estimates and not power measurements, however they maintain a close proximity to the true value once lock is attained. In simulations of the receiver, the receiver decisions are ignored until the 200-iterate transient period has passed, after which time data bit recovery commences. In the event that the channel SNR varies, the SNR estimator will track the changes in the same manner as the receiver initialization process did with an unknown SNR. Sharp variations will cause a 200-iterate transient period to occur, as happens at receiver initialization, and gradual changes will be tracked on a continual basis.

The issues of local versus global instantaneous SNR maximum likelihood detection and algorithm initialization are related. Global detection is desired in the absence of knowledge at estimate algorithm inception, but the average value drives the instantaneous peak detection once the averaging window has filled up with globally detected maximum likelihood instantaneous SNR values. This feedback of the current average SNR estimate serves as the initial approximation in the Newton-Raphson root approximation optimization procedure. The average SNR feedback enables the determination of local maxima in the vicinity of the current average SNR estimate after its value has been established via global values, which tends to drive the estimated SNR toward an accurate assessment of the true SNR. Observations of the probability vs. SNR functions led to the empirical initial SNR value of 23 dB for the instantaneous SNR detector Newton-Raphson algorithm during the averaging window initialization. This value is located about midway between the lobes of the observed double-peak functions and had good mobility toward either higher or lower values for the various observed traces.

The techniques used in this SNR estimator do not require differentiable equations for the probability function to be successful implementations. Standard derivative definition equations could be used in the Newton-Raphson iteration technique where two close values are used with the corresponding function responses, and the second derivative can be found in the same manner.

$$\frac{df(x)}{dx} \cong \frac{f(x_2) - f(x_1)}{x_2 - x_1} \quad (48)$$

and $$\frac{d^2 f(x)}{dx^2} \cong \frac{\frac{df(x_2)}{dx} - \frac{df(x_1)}{dx}}{x_2 - x_1}$$

It is necessary in the averaging process to find the probability of occurrence for the (received iterate, maximum probability SNR) pair, which can be done with empirical data rather than via closed-form equations.

What is claimed is:

1. A method in a computer system for determining a signal-to-noise ratio (SNR) in a signal comprising, for each iterate value of the signal:
   a. calculating an instantaneous maximum likelihood SNR;
   b. calculating a current average SNR value as a running weighted average of the instantaneous maximum likelihood SNR; and
   c. using the current average SNR value as feedback to the instantaneous maximum likelihood SNR to determine if a local instantaneous maximum likelihood value close to the current average SNR value exists, and if a local instantaneous maximum likelihood value close to the current average SNR exists, saving the local instantaneous maximum likelihood value as the SNR for the value of the signal.

2. The method according to claim 1, further comprising in step (c) if a local instantaneous maximum likelihood value close to the current average SNR does not exist, saving a global maximum value as the SNR for the value of the signal.

3. The method according to claim 1, wherein the instantaneous maximum likelihood SNR is determined using a lookup-table.

4. The method according to claim 3, wherein the instantaneous maximum likelihood SNR is the SNR having the largest probability density function value for the iterate value of the signal.

5. The method according to claim 1, wherein the instantaneous maximum likelihood SNR is derived using closed form equations.

6. The method according to claim 5, wherein the closed form equations comprise:
   a. modeling a transmit probability density function (PDF) as a DC level plus a summation of weighted Gaussian functions;
   b. modeling the channel noise PDF as a Gaussian function;
   c. convolving the transmit PDF function model with the noise PDF model to determine the received PDF model as a function of the instantaneous SNR;
   d. using the received PDF model for the received value; and
   e. determining an instantaneous maximum probability SNR for the received value using an iterative root approximation optimization technique.

7. The method according to claim 6, wherein the iterative root approximation technique uses Newton-Raphson equations.

8. The method according to claim 6, wherein the iterative root approximation technique using modified Newton-Raphson equations comprises:
   a. finding a maxima of the probability function of SNR;
   b. limiting a maximum correction per step to detect the maxima of the probability function of SNR; and
   c. multiplying a computed step size by at least two factors to prevent missing a peak, wherein the peak indicates the maximum likelihood SNR that caused the received iterate.

9. The method according to claim 8, wherein the at least two factors are alternating factors.

10. The method according to claim 5, wherein the iterative root approximation technique uses modified Newton-Raphson equations wherein the modified Newton-Raphson technique renders minima into repulsive fixed points and maxima into attractive fixed points.

11. The method according to claim 1, wherein:
   a. the running weighted average uses a reciprocal of a probability of a data pair as weighting values in the running weighted average; and
   b. the data pair comprises a received value of the iterate and the SNR most likely to have caused the received value.

12. The method according to claim 6, wherein a first derivative and a second derivative of the received value PDF are calculated for use in the iterative root approximation optimization technique using closed form equations.

13. The method according to claim 6, wherein a first derivative and a second derivative of the received value PDF are calculated for use in the iterative root approximation optimization technique using numerical differentiation.

14. The method according to claim 1, wherein the instantaneous maximum likelihood SNR for each iterate is determined using a Newton-Raphson iterative root approximation optimization technique.

15. The method according to claim 1, wherein the instantaneous maximum likelihood SNR for each iterate is determined using a modified Newton-Raphson root approximation.

16. The method according to claim 1, wherein the instantaneous maximum likelihood SNR estimate comprises:
   a. constructing a two dimensional probability model of a received probability density function;
   b. slicing the two dimensional model along an SNR axis;
   c. determining the maximum likelihood SNR for the current received value by using the two dimensional probability model in a Newton-Raphson iteration; and
   d. using a current average SNR value as feedback to the instantaneous maximum likelihood SNR estimator to determine if a local maximum instantaneous likelihood value close to the current average SNR value exists.

17. The method according to claim 16, further comprising saving the local maximum SNR as the SNR for the value of the signal, if a local maximum instantaneous likelihood value close to the current average SNR value exists.

18. The method according to claim 16, further comprising saving a global maximum value as the SNR for the value of the signal if a local maximum instantaneous likelihood value close to the current average SNR value does not exist.

19. The method according to claim 18, wherein the global maximum value is the maximum likelihood SNR value closest to the current average SNR estimate.

20. The method according to claim 2, wherein if a local maximum instantaneous likelihood value does not exist, the global maximum value is the maximum likelihood SNR value closest to the current average SNR estimate.

21. A computer-readable medium containing instructions for controlling a computer system for determining a signal-to-noise ratio (SNR) in a signal comprising, for each of a plurality of iterate values of the signal:
   a. calculating an instantaneous maximum likelihood SNR;
   b. calculating a current average SNR value as a running weighted average of the instantaneous maximum likelihood SNR; and
   c. using the current average SNR value as feedback to the instantaneous maximum likelihood SNR to determine if a local instantaneous maximum likelihood value close to the current average SNR value exists, and if a local instantaneous maximum likelihood value close to the current average SNR exists, saving the local instantaneous maximum likelihood value as the SNR for the value of the signal.

22. The method according to claim 21, further comprising in step (c) if a local instantaneous maximum likelihood value close to the current average SNR does not exist, saving a global maximum value as the SNR for the value of the signal.

23. The computer-readable medium according to claim 21, wherein the instantaneous maximum likelihood SNR is determined using a lookup-table.

24. The computer-readable medium according to claim 21, wherein the instantaneous maximum likelihood SNR is the SNR having the largest probability density function value for the iterate value of the signal.

25. The computer readable medium according to claim 21, wherein the instantaneous maximum likelihood SNR if the SNR having the largest probability density function for the iterate value of the signal.

26. The computer readable medium according to claim 21, wherein the instantaneous maximum likelihood SNR is derived using closed form equations.

27. The method according to claim 26, wherein the closed form equations comprise:
   a. modeling a transmit probability density function (PDF) as a DC level plus a summation of weighted Gaussian functions;
   b. modeling the channel noise PDF as a Gaussian function;
   c. convolving the transmit PDF function model with the noise PDF model to determine the received PDF model as a function of the instantaneous SNR;
   d. using the received PDF model for the received value; and
   e. determining an instantaneous maximum probability SNR for the received value using an iterative root approximation optimization technique.

28. The computer-readable medium according to claim 27, wherein the instantaneous maximum likelihood SNR for each iterate is determined using a Newton-Raphson iterative root approximation optimization technique.

29. The computer-readable medium according to claim 27, wherein the instantaneous maximum likelihood SNR for each iterate is determined using a modified Newton-Raphson root approximation.

30. The computer-readable medium according to claim 21, wherein the instantaneous maximum likelihood SNR estimate comprises:
   a. constructing a two dimensional probability model of the received probability density function;
   b. slicing the two dimensional model along an SNR axis;
   c. determining the maximum likelihood SNR for the current received value by using the two dimensional probability model in a Newton-Raphson iteration; and
   d. using a current average SNR value as feedback to the instantaneous maximum likelihood SNR estimator to determine if a local maximum instantaneous likelihood value close to the current average SNR value exists.

31. Computer executable software code stored on a computer readable medium, the code for controlling a computer system for determining a signal-to-noise ratio (SNR) in a signal comprising instructions, for each of a plurality of iterate values of the signal:
   a. calculating an instantaneous maximum likelihood SNR;
   b. calculating a current average SNR value as a running weighted average of the instantaneous maximum likelihood SNR; and
   c. using the current average SNR value as feedback to the instantaneous maximum likelihood SNR to determine if a local instantaneous maximum likelihood value close to the current average SNR value exists:
      i. if a local instantaneous maximum likelihood value close to the current average SNR exists, saving the local instantaneous maximum likelihood value as the SNR for the value of the signal;
      ii. if a local instantaneous maximum likelihood value close to the current average SNR does not exist, saving a global maximum value as the SNR for the value of the signal, wherein the global maximum value comprises the maximum likelihood SNR value closes to the current average SNR estimate.

32. A method in a computer system for displaying probability density function (PDF) dependency on signal-to-noise ratio (SNR) in a signal comprising, for each iterate value of the signal:

a. displaying a two dimensional probability model of a received probability density function;

b. displaying a maximum likelihood SNR for a current received value on the two dimensional model sliced along an SNR axis;

c. displaying a local instantaneous maximum likelihood value as the SNR if a local maximum likelihood value close to the current average SNR exists; and d. displaying a global maximum value as the SNR if a local instantaneous maximum value close to the current average SNR does not exist.

\* \* \* \* \*